Dec. 6, 1949     L. F. JONES     2,490,306
INSTRUMENT LANDING SYSTEM
Filed April 30, 1947
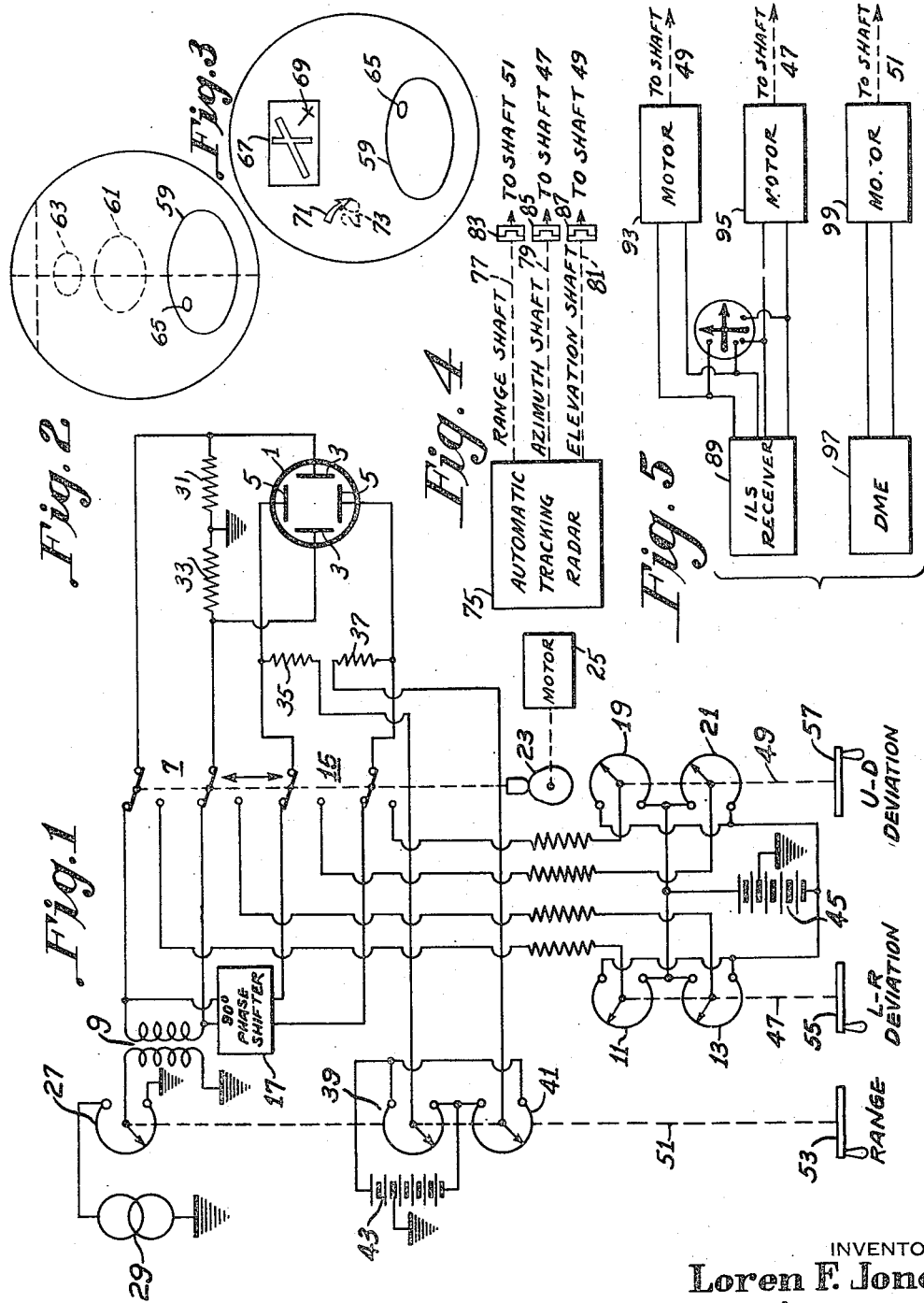
INVENTOR.
Loren F. Jones
BY
ATTORNEY Patented Dec. 6, 1949

2,490,306

UNITED STATES PATENT OFFICE 2,490,306

INSTRUMENT LANDING SYSTEM

Loren F. Jones, Philadelphia, Pa., assignor to Radio Corporation of America, a corporation of Delaware Application April 30, 1947, Serial No. 745,031

4 Claims. (Cl. 343—112)

This invention relates to instrument landing or ground approach systems for aircraft, and more particularly to improvements in the visual display of the information required by the pilot of an aircraft to effect a landing.

In prior art instrument landing systems, deviation of an aircraft from the desired glide path is shown on a crossed-pointer indicator, the intersection of the pointers being roughly related to the position of the craft with respect to the glide path. Such an instrument gives no continuous indication of the distance of the craft from the point of contact with the ground.

The principal object of the present invention is to provide a glide-path deviation indicator which also shows the distance to the point of contact.

Another object is to provide a deviation indicator whose display is readily interpretable and is natural and easy for the pilot to use without special training.

A further object of this invention is to provide a glide path indicator system particularly adapted for use in conjunction with a ground based radar and television relay system such as that described in copending U. S. patent application Serial Number 607,999½, filed July 31, 1946 by Loren F. Jones and entitled Radio navigation system.

The invention will be described with reference to the accompanying drawing, wherein Figure 1 is a schematic circuit diagram of a typical embodiment, Figure 2 illustrates the type of indication displayed by the system of Figure 1, Figure 3 shows a modification of Figure 2, Figure 4 illustrates the use of radar equipment for automatic operation of the system of Figure 1 for producing the display at a ground station, and Figure 5 illustrates the use of the airborne receiver of an instrument landing system of the equisignal beacon type and of the receiver of distance measuring equipment, "DME, for automatic operation of the system of Figure 1 for producing the display directly in an aircraft.

Referring to Figure 1, the indicator is a conventional cathode ray oscilloscope tube 1, including horizontal beam deflection plates 3 and vertical deflection plates 5, as well as the usual cathode, control grids, anodes, and power supplies, not shown. The horizontal deflection plates 3 are connected to a double throw switch 7, through which they are selectively connected to the secondary of a transformer 9 or to the movable contacts of a pair of adjustable voltage dividers 11 and 13. The vertical deflection plates 5 are similarly connected through a double throw switch 15, either through a 90 degree phase shifter 17 to the transformer 9, or to a pair of voltage dividers 19 and 21. The switches 7 and 15 are thrown cyclically and in synchronism with each other from one position to the other by means of a cam 23 driven by a motor 25. The speed of the motor 25 is such as to operate the switches at a rate of, for example, twenty times per second.

The primary of the transformer 9 is connected to a voltage divider 27, supplied by an alternating current source 29. The frequency of the source 29 may be 60 cycles per second or higher. The transformer 9 is included to provide direct-current isolation between the voltage divider 27 and the deflection circuits of the tube 1. A pair of resistors 31 and 33 are connected from the plates 3 to ground to balance the deflection circuit with respect to ground potential. A similar pair of resistors 35 and 37 are connected to the vertical deflection plates 5, but are returned to ground through an adjustable biasing arrangement comprising voltage dividers 39 and 41 connected across a D.-C. source 43 like the beam centering circuits ordinarily used in cathode ray oscilloscopes. Other, similar circuits (not shown) may be provided for initial centering of the cathode ray beam in setting up the equipment for operation.

The voltage dividers 11, 13, 19 and 21 are also connected like centering controls across a D.-C. source 45. The voltage dividers 11 and 13 are ganged on a single shaft 47, and the dividers 19 and 21 are similarly coupled to a shaft 49. The voltage dividers 27, 39 and 41 are likewise gang-connected on a shaft 51.

In the operation of the system, the shaft 51 is set at a position corresponding to the distance of the aircraft from the desired point of contact. The shaft 47 is adjusted according to the deviation of the craft to the left or right of the glide path, and the shaft 49 is adjusted in response to deviation above or below the glide path. These adjustments may be made manually, by means of hand wheels 53, 55 and 57, respectively, in accordance with information derived by radio or other means. However, it is preferable at present to make the system automatic. For example, where the display is to be produced at a ground station for transfer to an aircraft over a television relay, it may be made automatic by operating the shafts with follow-up motors controlled in known manner by a ground-based radio locator system of the type which "tracks" an aircraft in range, azimuth and elevation. As shown in Figure 4, an automatic tracking radar 75, which may be of the type designated as the SCR 584, has its range, azimuth, and elevation output shafts 77, 79 and 81 connected through couplings 83, 85 and 87 respectively to the shafts 51, 47 and 49. The SCR 584 is described in Electronics magazine, in the December 1945 issue at page 104 et seq., the February 1946 issue at page 110, and the November 1946 issue on page 104. The magazine is published by McGraw Hill Company, New York, New York. The shafts 51, 47 and 49 are positioned automatically by the radar as the aircraft approaches for landing. Alternatively, where the display is to be produced directly in an aircraft, the shafts 47 and 49 may be controlled by localizer and glide path beacon signals received on the aircraft, and the shaft 57 may be controlled by separate distance measuring equipment. Referring to Figure 5, the airborne receiver 89 of an instrument landing system of the equisignal beacon type, such as that described on pages 262–294 of vol. 22 No. 4 (1944) of Electrical Communications published by the International Telephone and Telegraph Corporation, is connected to a conventional crossed pointer indicator 91 and to a pair of motors 93 and 95. The motor 93 is energized or controlled by the up-down output of the receiver 89 and the motor 95 is similarly controlled by the left-right output. The airborne portion 97 of a DME (distance measuring equipment) set is connected to a third motor 99. The DME may be of the type described in the bulletin entitled Radio Pulse Distance Measuring Equipment, issued by the Technical Development Service of the Office of Federal Airways, Civil Aeronautics Administration, U. S. Department of Commerce. The motors 93, 95 and 99 are connected to the shafts 49, 47 and 51 respectively, and maintain said shafts in angular positions corresponding to the elevation deviation, and range of the aircraft referred to the correct landing path.

When the switches 7 and 15 are in their upper positions as shown, the output of the A.-C. source is applied directly to the horizontal deflection plates 3 and through the 90 degree phase shifter 17 to the vertical deflection plates 5. This causes the cathode ray beam to trace a closed figure on the fluorescent screen of the tube 1. If the voltages applied to the two sets of deflection plates were equal, the beam would draw a circle. Preferably some attenuation is introduced in the vertical deflection circuit, for example by the phase shifter 17, so that an elliptical pattern with its major axis horizontal is formed on the face of the tube 1. The size of the ellipse is controlled by the voltage divider 27, and is approximately proportional to the distance of the craft from the point of contact. The position of the ellipse vertically on the face of the tube 1 is controlled by the voltage dividers 39 and 41, also in accordance with the distance. Thus, when the craft is at maximum distance, the ellipse is large and appears at the bottom of the screen, as shown in solid line at 59 in Figure 2. As the distance decreases, the ellipse becomes smaller and moves upward, as shown at successive intervals by dash lines 61 and 63 respectively. Motion of the ellipse could be in reverse direction, if preferred.

When the switches 7 and 15 are in their lower positions, the cathode ray beam does not trace a figure, but remains stationary, producing a single bright spot 65 on the screen. The rate of operation of the switches 7 and 15 is such that the ellipse and the spot both seemingly appear continuously. Since the voltage dividers 39 and 41 remain connected to the plates 5, the spot 65 is normally centered with respect to the ellipse 59. It is displaced to the left or right of the center by the voltage dividers 11 and 13, and above or below the center by the voltage dividers 19 and 21, in accordance with the deviation of the aircraft from the glide path. Thus, in the solid line pattern in Figure 2, the position of the spot 65 with respect to the ellipse 59 indicates that the craft is slightly above the glide path, and somewhat to the left. Moreover, the size and position of the ellipse shows that the craft has completed about one-fourth of its total glide.

The pattern is made elliptical to indicate to the pilot that more tolerance is permitted in left-right deviation than in up-down deviation. For following the proper glide path exactly, the spot must be maintained at the center of the ellipse. This type of display presents the visual sensation of flying down a cone; the spot represents the aircraft and the ellipse represents a cross-section of the cone, the apex of the cone being at the desired point of contact with the runway.

It will be apparent without further illustration that the voltage dividers 39 and 41 may be suitably tapered if a curved glide path is required, and that other voltage dividers may be provided, designed for different wind conditions and aircraft characteristics, with switches for selecting the proper pair. The described indicator may be set up at a ground station and controlled automatically as mentioned above, the display being relayed by television to the aircraft. In this event, visual information regarding the airport, obstructions, wind velocity and direction, etc. may be added to the transmitted picture, as shown in Figure 3. A plan view of the airport is indicated at 67, and an obstruction at the point 69. The wind direction is shown by the arrow 71. The wind velocity is indicated by the numeral 73 adjacent the arrow 71.

I claim as my invention:

1. A system for indicating the position of an aircraft with respect to a predetermined flight path including a cathode ray oscilloscope tube, a source of two phase alternating current and a source of bias, means for controlling the amplitude of said alternating current and the magnitude of said bias in accordance with the position of said craft longitudinally on said path, a second source of bias and means for controlling the magnitude of said second bias in accordance with deviation of said craft laterally from said path, a third source of bias and means for controlling the magnitude of said third bias in accordance with deviation of said craft vertically with respect to said path, and periodic switch means cyclically applying first said two phase alternating current and said first bias to said tube, and then said second bias and the sum of said first and third biasses to said tube.

2. In an instrument landing system for aircraft, apparatus for visually indicating the position of a craft with respect to a predetermined glide path, including a cathode ray oscilloscope tube provided with vertical and horizontal beam deflection devices, a source of deflection signals which, when connected to said tube, causes the cathode ray beam to trace a circle or an ellipse, a source of bias which determines the position of said ellipse vertically on said tube, and means controlling the amplitude of said deflection signals and the magnitude of said bias in accordance with the position of said craft longitudinally on said glide path; a second source of bias which when connected to said tube controls the position of said beam horizontally on said tube, and means controlling the magnitude of said second bias in accordance with deviation of said craft laterally with respect to said glide path; a third source of bias which when connected to said tube controls the position of said beam vertically of said tube, and means controlling the magnitude of said third bias in accordance with deviation of said craft transversely in the vertical direction with respect to said glide path, and periodic switch means cyclically connecting said deflection devices first to said deflection signal generator and said first bias source and then to said second and third bias sources, alternating between said connections at a rate whose period is less than the visual persistence of the images formed by said beam.

3. A system for indicating the position of an aircraft with respect to a predetermined flight path, including means providing a visible display of a geometric figure substantially of the shape of a conic section, means controlling the size of said figure as a function of the distance of said craft from the termination of said flight path, means providing a second display effectively superimposed on said first display, and means controlling the position of said second display with respect to that of said first display in accordance with deviations in the position of said craft transversely with respect to said flight path.

4. In a system for indicating the position of an aircraft with respect to a predetermined flight path, including means providing a visible display representing a transverse section of a flight path, means providing a further display representing said craft and means controlling the position of said second display with respect to said first display in accordance with deviation in the position of said craft transversely from said flight path; means for determining the distance of said craft from the termination of said path, and means responsive to said distance determining means to superimpose a further control on the position of said second display with respect to said first display.

LOREN F. JONES.

REFERENCES CITED

The following references are of record in the file of this patent:

UNITED STATES PATENTS

| Number | Name | Date |
|---|---|---|
| 2,262,245 | Moseley et al. | Nov. 11, 1941 |
| 2,396,112 | Morgan | Mar. 5, 1946 |
| 2,400,232 | Hall | May 14, 1946 |
| 2,416,591 | Muntz et al. | Feb. 25, 1947 |
| 2,423,104 | Labin | July 1, 1947 |
| 2,427,905 | Fyler | Sept. 23, 1947 |
| 2,451,793 | Alexanderson et al. | Oct. 19, 1948 |